No. 810,651. PATENTED JAN. 23, 1906.
F. X. HOFBAUER.
ELECTRIC GENERATOR FOR BICYCLES.
APPLICATION FILED JUNE 14, 1902.

2 SHEETS—SHEET 1.

WITNESSES:
Henry Krug
Russell M. Everett

INVENTOR:
Frank X. Hofbauer
BY
Drake & Co
ATTORNEYS

No. 810,651. PATENTED JAN. 23, 1906.
F. X. HOFBAUER.
ELECTRIC GENERATOR FOR BICYCLES.
APPLICATION FILED JUNE 14, 1902.

2 SHEETS—SHEET 2.

WITNESSES:
Henry Krug
Russell M. Everett

INVENTOR
Frank X. Hofbauer
BY
Drake & Co.
ATTORNEYS.

UNITED STATES PATENT OFFICE.

FRANK X. HOFBAUER, OF WEST ORANGE, NEW JERSEY.

ELECTRIC GENERATOR FOR BICYCLES.

No. 810,651.  Specification of Letters Patent.  Patented Jan. 23, 1906.

Application filed June 14, 1902. Serial No. 111,597.

*To all whom it may concern:*

Be it known that I, FRANK X. HOFBAUER, a citizen of the United States, residing at West Orange, in the county of Essex and State of New Jersey, have invented certain new and useful Improvements in Electric Generators for Bicycles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to enable a bicycle or other vehicle having an electrical headlight to generate the illuminating power while the vehicle is in motion; to avoid the use of storage batteries and the weight, the lack of continuity of service, and other disadvantages incident thereto; to reduce the cost of construction as compared with the other electric-lighting means having storage batteries, and to secure other advantages and results, some of which may be referred to hereinafter in connection with the description of the working parts.

The invention consists in the improved electric headlight generator of electricity for bicycles and in the arrangements and combinations of parts of the same, all substantially as will be hereinafter set forth, and finally embraced in the clauses of the claim.

Figure 1:
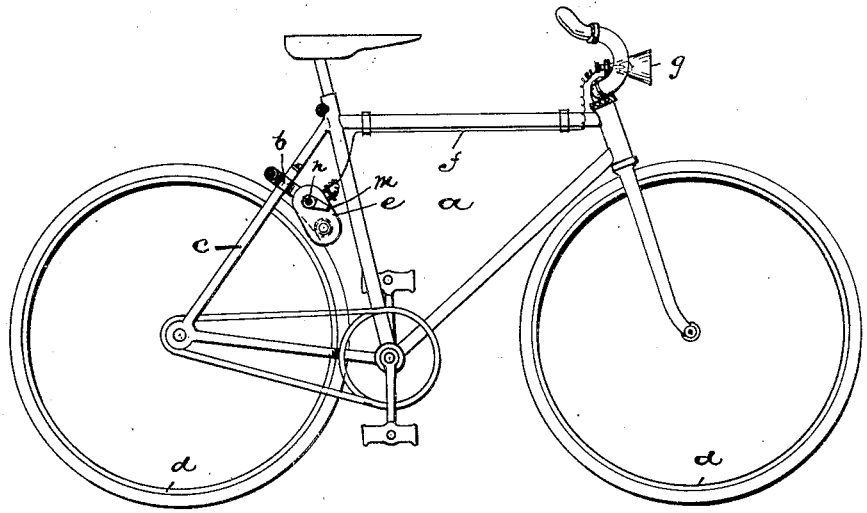
Figure 2:
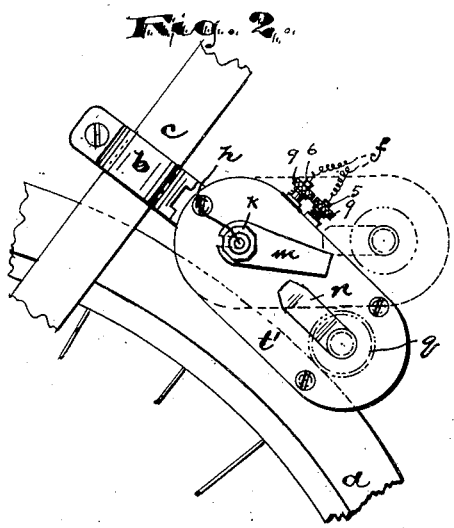
Figure 3:
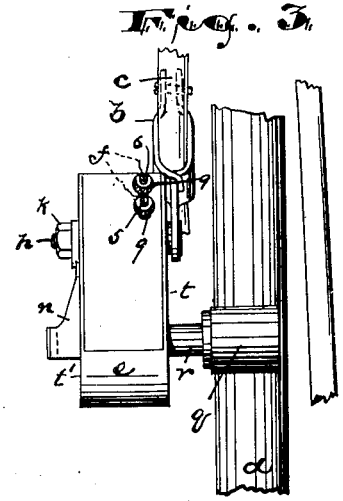
Figure 4:
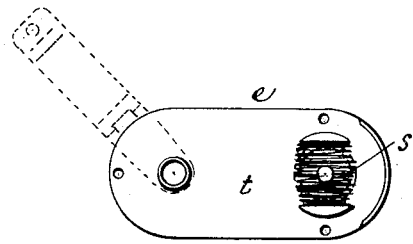
Figure 5:
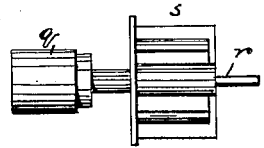
Figure 6:
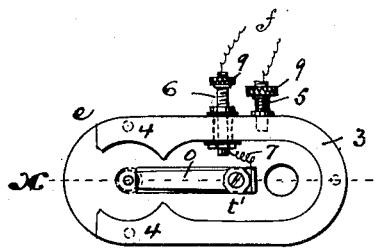
Figure 7:
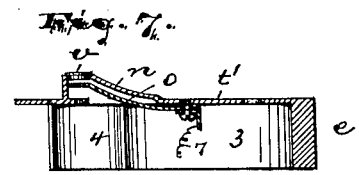
Figure 8:
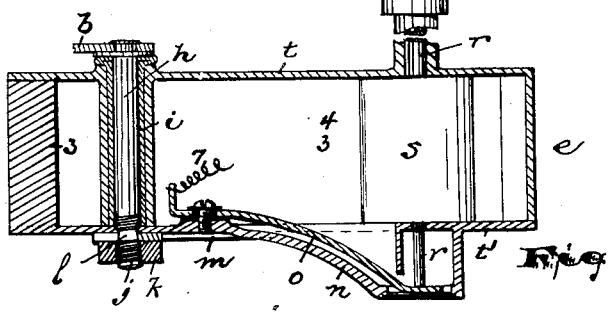
Figure 9:
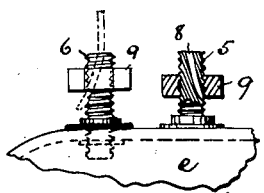
Figure 11:
Figure 10:
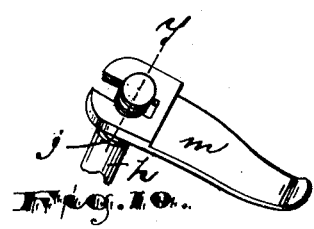

Referring to the accompanying drawings, in which like characters of reference indicate corresponding parts in each of the several figures, Figure 1 is a side elevation of a bicycle having my improved lighting appliances attached thereto. Fig. 2 is a side elevation, on an enlarged scale, showing a dynamo attached to the vehicle-frame and adapted to be operated by the wheel of the vehicle. Fig. 3 is a front view of the same. Fig. 4 is an inside view of the armature-carrying plate of the dynamo, showing the armature thereon. Fig. 5 is a detail view of the armature arranged in connection with a friction-wheel adapted to engage the large running-wheel of the vehicle. Fig. 6 is an inside view of the magnet of the dynamo. Fig. 7 is a section of the same, taken at line $x$ of Fig. 6. Fig. 8 is an enlarged sectional view of the dynamo. Fig. 9 is a detail view showing certain binding-posts on said dynamo. Fig. 10 is a perspective detail of a dynamo-holding shaft and spring; and Fig. 11 is a section of the same taken on line $y$ of Fig. 10.

In said drawings, $a$ indicates a bicycle or other vehicle, having a frame $c$ and running-wheels $d$ $d$, of any ordinary construction. Upon the frame $c$ of said vehicle is clamped, by means of a suitable clip or clamp $b$, a dynamo $e$, in connection, through wires $f$, with a light or electrical lamp $g$. The said lamp is of any suitable construction and preferably of four-candle power capacity, the said lamp being stationed on the handle-bar or frame at a point preferably between the handles of said handle-bar and serving as a headlight for the vehicle. Upon the clamp $b$ is arranged a pivotal arm $h$, upon which the dynamo $e$ is adapted to turn to and from operative relation with the said running-wheel, being preferably incased with a rubber sheathing or sleeve $i$, Fig. 8, whereby the dynamo is prevented from rattling upon the vehicle. The said pivotal arm $h$ projects at right angles to the plane of the running-wheel and is fixed in its relation to the clamp in any suitable manner and at its opposite end from where it engages the clamp is provided with a thread $j$, adapted to receive a nut $k$. It is also notched or slotted at opposite sides, as at $l$ in Fig. 11, to receive a slotted spring $m$, the prongs of the said spring entering the said notches and being thus held rigidly from turning in its relation to the said pivotal arm $h$. The said spring $m$ is rigidly secured upon the arm $h$ by the nut $k$ and is thus stationary in its relation to the frame $c$, and the spring serves as a holder for a dynamo, the outer side of which latter is provided with a suitable protuberance $n$, adapted to project over the upper edge of the spring $m$ when the dynamo is raised to its inoperative position. Thus when the dynamo $e$ is raised to the position shown in dotted outline, Fig. 2, the said dynamo will not receive motive power from the wheel $d$ and will not generate an electrical current or effect an illumination of the lamp. In this position the dynamo may be carried by the vehicle during day service. By drawing the spring $m$ outward away from the protuberance $n$ the said dynamo at its free end will gravitate, turning on the pivotal arm $h$, so that the friction-wheel $q$ on the armature-shaft $r$ will be brought into engagement with the periphery of the wheel $d$.

The armature $s$ of the dynamo is of any usual construction and is fixed on the shaft $r$, with the frictional wheel $q$, so as to turn therewith. Said armature $s$ or the shaft thereof extends clear through the side plates $t$ $t'$ of the dynamo, which plates, with the magnet, form a casing which incloses said armature and prevents access of dust thereto. At one side of the plate $t$ is the frictional wheel $q$, and at the opposite side of the armature the shaft $r$ projects out into the box-like extension, which serves as the protuberance $n$, above referred to. Said box-like extension interiorly is hollow to receive the free end of a contact-spring $o$, the box $n$ serving as an inclosure for the said spring $o$ and the projecting end of the armature-shaft. At the point of contact of the dynamo-shaft and spring $o$ the said box may be open and may be closed by a cap or plug $v$, as shown in Fig. 7, to prevent the entrance of moisture or dust, the opening serving to permit of certain mechanical operations in the construction of the device. Upon the plate $t'$ is fastened the permanent magnet 3, between the arms 4 4 of which the armature rotates, the plate $t'$, as also the plate $t$, being of brass, copper, aluminium, or other non-magnetic metal, and the magnet being preferably of cast-iron. The binding-screws 5 and 6, one in direct connection with the magnet and the other seated on insulation on said magnet and in connection, through wires 7, with the contact-spring $o$, armature-shaft $r$, and armature $s$ are of peculiar construction to prevent the binding-nuts from jarring loose. Said binding-posts are shown in detail in Fig. 9, where they are perforated, as at 8, the perforations extending longitudinally from the outer extremity of said posts at or near the axes thereof in an inclined direction and opening through the threaded peripheries of the posts, and thus when the wires are thrust through said perforations the nuts 9 of the said posts are forced directly and hard against the contacting wires, so as to secure a perfect contact, and at the same time the wires serve as locks to prevent the detachment or loosening due to the jarring of the vehicle. The course of the electric current from the armature $s$ is through the shaft $r$, contact-spring $o$, wire 7, insulated binding-posts 6, through one of the wires $f$ to the lamp $q$, thence back through another wire $f$ to the post 5 and magnet 3.

I am aware that various detail changes may be made in the construction of my device without departing from the spirit or scope of the invention.

Having thus described the invention, what I claim as new is—

1. The combination with the bicycle-frame and running-wheel, the former having a pivotal arm and holding-spring, of a dynamo-electric machine arranged on said pivotal arm and adapted to engage the running-wheel of the bicycle and be operated thereby and adapted to engage said holding-spring and be held thereby out of operative relation to said running-wheel, the dynamo being provided with a box-like protuberance serving the double purpose as a receptacle for contacting conducting devices of the dynamo and as an arm or protuberance to engage the holding-spring, substantially as set forth.

2. The combination with the headlight and conducting-wires, of a dynamo-electric machine comprising a magnet, non-magnetic side plates, an armature rotating between said side plates, between the prongs of the magnet, the said side plate furnishing bearings for a pivotal arm and a box-like protuberance, a contact-spring in said protuberance engaging the armature-shaft and conductors of said magnet and spring with said headlight, substantially as set forth.

In testimony that I claim the foregoing I have hereunto set my hand this 31st day of May, 1902.

FRANK X. HOFBAUER.

Witnesses:
CHARLES H. PELL,
C. B. PITNEY.